(12) United States Patent
Sisken et al.

(10) Patent No.: US 6,981,375 B2
(45) Date of Patent: Jan. 3, 2006

(54) TURBOCHARGED INTERNAL COMBUSTION ENGINE WITH EGR FLOW

(75) Inventors: Kevin Dean Sisken, Saline, MI (US); Brian Kenneth Bolton, Birmingham, MI (US)

(73) Assignee: Detroit Diesel Corporation, Detroit, MI (US)

( * ) Notice: Subject to any disclaimer, the term of this patent is extended or adjusted under 35 U.S.C. 154(b) by 100 days.

(21) Appl. No.: 10/663,306

(22) Filed: Sep. 16, 2003

(65) Prior Publication Data

US 2005/0056017 A1    Mar. 17, 2005

(51) Int. Cl.
*F01N 3/02* (2006.01)
*F02M 25/06* (2006.01)

(52) U.S. Cl. ........................... 60/612; 60/605.2
(58) Field of Classification Search .................. 60/278, 60/311, 605.2, 612
See application file for complete search history.

(56) References Cited

U.S. PATENT DOCUMENTS

| | | | |
|---|---|---|---|
| 5,142,866 A | | 9/1992 | Yanagihara et al. |
| 5,611,202 A | | 3/1997 | Sumser et al. |
| 5,771,868 A | * | 6/1998 | Khair .......................... 60/605.2 |
| 6,062,026 A | * | 5/2000 | Woollenweber et al. ... 60/605.2 |
| 6,360,732 B1 | | 3/2002 | Bailey et al. |
| 6,378,308 B1 | * | 4/2002 | Pfluger ......................... 60/612 |
| 6,412,279 B1 | | 7/2002 | Coleman et al. |
| 6,460,519 B1 | | 10/2002 | Pierpont |
| 6,694,736 B2 | * | 2/2004 | Pfluger ......................... 60/612 |
| 2005/0103013 A1 | * | 5/2005 | Brookshire et al. ......... 60/605.2 |

FOREIGN PATENT DOCUMENTS

| | | |
|---|---|---|
| EP | 0718481 | 6/1996 |
| JP | 2000213384 A | 1/1999 |
| WO | WO 2004/044412 A1 | 5/2004 |

* cited by examiner

*Primary Examiner*—Sheldon J Richter
(74) *Attorney, Agent, or Firm*—Brooks Kushman P.C.

(57) ABSTRACT

A turbocharged internal combustion engine is operated such that the intake manifold pressure generally exceeds the exhaust manifold pressure. A low pressure turbocharger and a high pressure turbocharger are provided in series. An exhaust gas recirculation (EGR) system passively routes a portion of the exhaust gases to the high pressure turbocharger compressor inlet.

14 Claims, 1 Drawing Sheet

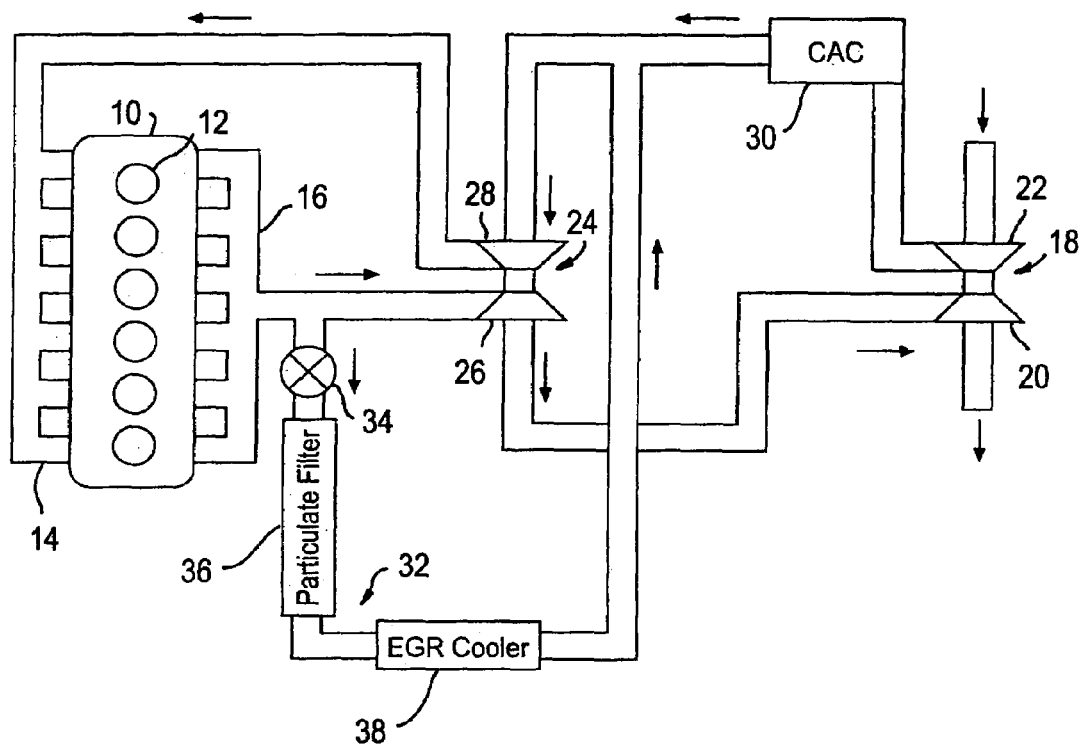

TURBOCHARGED INTERNAL COMBUSTION ENGINE WITH EGR FLOW

STATEMENT REGARDING FEDERALLY SPONSORED RESEARCH OR DEVELOPMENT

This invention was made with Government support under Contract No. DE-FC05-00OR22805. The Government has certain rights to the invention.

BACKGROUND OF THE INVENTION

1. Field of the Invention

The present invention relates to a turbocharged internal combustion engine that includes an exhaust gas recirculation (EGR) system.

2. Background Art

The heavy-duty engine business is extremely competitive. Increasing demands are being placed on engine manufacturers to design and build engines that provide better engine performance, improved reliability, and greater durability while meeting more stringent emission and noise requirements. One approach to meet more stringent emission requirements is to utilize an exhaust gas recirculation (EGR) system.

On a conventional turbocharged diesel engine, the intake manifold is at a higher pressure than the exhaust manifold. This relationship results in the best tradeoff among good fuel economy (due to positive pumping work), engine breathing, and turbocharger operation. The problem is that with the intake manifold at a higher pressure than the exhaust manifold, exhaust gases cannot flow into the intake manifold for EGR. Potential solutions for this problem with conventional engines are to either configure the air system so that the exhaust manifold pressure is made higher than the intake manifold pressure, or use a pump to flow EGR. Setting the exhaust manifold pressure higher than intake manifold pressure is bad for fuel economy.

Further background information may be found in U.S. Pat. Nos. 5,611,202; 6,360,732; 6,460,519; and 6,412,279.

For the foregoing reasons, there is a need to address these issues while still allowing EGR to flow.

SUMMARY OF THE INVENTION

It is, therefore, an object of the present invention to provide an improved internal combustion engine wherein a two turbocharger system is utilized to maintain intake manifold pressure higher than exhaust manifold pressure yet is still able to flow EGR.

In carrying out the above object, an internal combustion engine is provided. The internal combustion engine has a plurality of cylinders. The engine includes an intake manifold and an exhaust manifold. The engine is operated such that the intake manifold pressure generally exceeds the exhaust manifold pressure. The engine further comprises a low pressure turbocharger, a high pressure turbocharger, and an exhaust gas recirculation (EGR) system. The low pressure turbocharger includes a turbine driven by the exhaust gases and a compressor having an inlet receiving fresh intake air and an outlet providing low pressure charge air. The high pressure turbocharger includes a turbine driven by the exhaust gases and a compressor having an inlet receiving the low pressure charge air and an outlet providing high pressure charge air to the intake manifold. The EGR system passively routes a portion of the exhaust gases to the high pressure turbocharger compressor inlet.

It is appreciated that one or both of the turbochargers could be free floating, wastegated, or variable geometry in design. The engine preferably includes a charge air cooler between the low pressure turbocharger compressor outlet and the high pressure turbocharger compressor inlet. A preferred engine further includes a particulate filter located in the EGR system to filter particulate matter from the exhaust gases prior to introduction to the high pressure turbocharger compressor inlet. A preferred engine further includes an EGR cooler located in the EGR system downstream of the particulate filter to cool the exhaust gases prior to introduction to the high pressure turbocharger compressor inlet. The exhaust gases are then introduced at a location downstream of the charge air cooler.

In a preferred embodiment, a compression ratio of the low pressure turbocharger is greater than a compression ratio of the high pressure turbocharger. The compression ratio of the low pressure turbocharger is preferably greater than 1.5 times the compression ratio of the high pressure turbocharger.

Further, in carrying out the present invention, a method of controlling an internal combustion engine with a plurality of cylinders is provided. The engine includes an intake manifold and an exhaust manifold. The engine is operated such that the intake manifold pressure generally exceeds the exhaust manifold pressure. The engine includes a low pressure turbocharger including a turbine driven by the exhaust gases and a compressor having an inlet receiving fresh intake air and an outlet providing low pressure charge air. The engine further includes a high pressure turbocharger including a turbine driven by the exhaust gases and a compressor having an inlet receiving the low pressure charge air and an outlet providing high pressure charge air to the intake manifold. The method further comprises passively routing a portion of the exhaust gases to the high pressure turbocharger compressor inlet to provide exhaust gas recirculation.

A preferred method cools the low pressure charge air from the low pressure turbocharger compressor outlet prior to the high pressure turbocharger compressor inlet. A preferred method filters particulate matter from the exhaust gases prior to introduction to the high pressure turbocharger compressor inlet. Further, a preferred method cools the exhaust gases prior to introduction to the high pressure turbocharger compressor inlet. The exhaust gases are then introduced to cooled low pressure charge air.

The advantages associated with embodiments of the present invention are numerous. For example, embodiments of the present invention maintain intake manifold pressure higher than exhaust manifold pressure yet are still able to flow EGR by passively routing a portion of the exhaust gases to a location between turbocharging stages in a multiple turbocharger engine.

The above object and other objects, features, and advantages of the present invention are readily apparent from the following detailed description of the preferred embodiment when taken in connection with the accompanying drawings.

BRIEF DESCRIPTION OF THE DRAWING

The FIGURE is a schematic diagram of an internal combustion engine made in accordance with a preferred embodiment of the present invention.

DETAILED DESCRIPTION OF THE PREFERRED EMBODIMENT

An internal combustion engine includes an engine block 10 with a plurality of cylinders 12. The illustrated engine is a compression-ignition internal combustion engine such as a heavy-duty diesel fuel engine. Cylinders 12 receive pressurized fuel from a fuel supply in a known manner. The engine includes an intake manifold 14 and an exhaust manifold 16. The engine is a turbocharged engine and is operated such that the intake manifold pressure generally exceeds the exhaust manifold pressure. The air system is configured with two turbochargers. A low pressure turbocharger 18 includes a turbine 20 driven by the exhaust gases and a compressor 22. Compressor 22 has an inlet receiving fresh intake air and an outlet providing low pressure charge air. A high pressure turbocharger 24 includes a turbine 26 driven by the exhaust gases and a compressor 28. Compressor 28 has an inlet receiving the low pressure charge air from low pressure turbocharger 18 and an outlet providing high pressure charge air to intake manifold 14. Fresh intake air enters the low pressure turbocharger compressor 22 (that is, the first stage compressor). Compressor 22 is sized to do most of the compression work, for example, a 2.5:1 compression ratio. Low pressure charge air from the outlet of compressor 22 flows through a charge air cooler (CAC) 30. After charge air cooler 30, a portion of the engine exhaust gas is introduced by EGR system 32, and the mixture of fresh air and recirculated exhaust gas flows through the high pressure compressor 28 (that is, the second stage compressor). The second stage compressor has a relatively low compression ratio, for example, 1.4:1. In this way, the temperature rise across the second stage compressor is relatively low and there is no strong need to send this air through a second charge air cooler.

EGR system 32 includes EGR valve 34 for selectively allowing a portion of the exhaust gases to be passively routed for introduction into the intake air stream. The EGR path includes a particulate filter 36 and an EGR cooler 38. Exhaust gas is pulled from exhaust manifold 16 before the turbochargers. The EGR gas flows through EGR valve 34, particulate filter 36, and EGR cooler 38 and then enters the inlet air stream between charge air cooler 30 and high pressure compressor 28. The exhaust air not taken for recirculation flows through high pressure turbine 26, then through low pressure turbine 20.

It is appreciated that embodiments of the present invention provide a technique for generating the pressure drop required to passively flow EGR by using multiple turbochargers. Filter 36 is a diesel particulate filter (DPF) that removes particulates so that they do not enter into compressor 28. This removal protects the compressor by removing the particulate matter from the EGR stream. By locating the DPF upstream of EGR cooler 38, temperatures into the DPF would be hot enough for good regeneration. Locating EGR cooler 38 upstream of the DPF extends the life of the cooler by preventing fowling from soot.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An internal combustion engine with a plurality of cylinders, the engine including an intake manifold and an exhaust manifold, the engine being operated such that the intake manifold pressure generally exceeds the exhaust manifold pressure, the engine further comprising:
    a low pressure turbocharger including a turbine driven by the exhaust gases and a compressor having an inlet receiving fresh intake air and an outlet providing low pressure charge air;
    a high pressure turbocharger including a turbine driven by the exhaust gases and a compressor having an inlet receiving the low pressure charge air and an outlet providing high pressure charge air to the intake manifold;
    an exhaust gas recirculation (EGR) system passively routing a portion of the exhaust gases to the high pressure turbocharger compressor inlet; and
    wherein a compression ratio of the low pressure turbocharger is greater than a compression ratio of the high pressure turbocharger.

2. The internal combustion engine of claim 1 further comprising:
    a charge air cooler between the low pressure turbocharger compressor outlet and the high pressure turbocharger compressor inlet.

3. The internal combustion engine of claim 1 further comprising:
    a particulate filter located in the EGR system to filter particulate matter from the exhaust gases prior to introduction to the high pressure turbocharger compressor inlet.

4. The internal combustion engine of claim 1 further comprising:
    an EGR cooler located in the EGR system to cool the exhaust gases prior to introduction to the high pressure turbocharger compressor inlet.

5. The internal combustion engine of claim 1 further comprising:
    a particulate filter located in the EGR system to filter particulate matter from the exhaust gases prior to introduction to the high pressure turbocharger compressor inlet; and
    an EGR cooler located in the EGR system downstream of the particulate filter to cool the exhaust gases prior to introduction to the high pressure turbocharger compressor inlet.

6. The internal combustion engine of claim 1 further comprising:
    a charge air cooler between the low pressure turbocharger compressor outlet and the high pressure turbocharger compressor inlet;
    a particulate filter located in the EGR system to filter particulate matter from the exhaust gases prior to introduction to the high pressure turbocharger compressor inlet; and
    an EGR cooler located in the EGR system downstream of the particulate filter to cool the exhaust gases prior to introduction to the high pressure turbocharger compressor inlet, wherein the exhaust gases are introduced at a location downstream of the charge air cooler.

7. The internal combustion engine of claim 1 wherein the compression ratio of the low pressure turbocharger is greater than 1.5 times the compression ratio of the high pressure turbocharger.

8. A method of controlling an internal combustion engine with a plurality of cylinders, the engine including an intake manifold and an exhaust manifold, the engine being operated such that the intake manifold pressure generally exceeds the exhaust manifold pressure, the engine including a low pressure turbocharger including a turbine driven by the exhaust gases and a compressor having an inlet receiving fresh intake air and an outlet providing low pressure charge air, and the engine further including a high pressure turbocharger including a turbine driven by the exhaust gases and a compressor having an inlet receiving the low pressure charge air and an outlet providing high pressure charge air to the intake manifold, the method further comprising:

passively routing a portion of the exhaust gases to the high pressure turbocharger compressor inlet to provide exhaust gas recirculation, wherein a compression ratio of the low pressure turbocharger is greater than a compression ratio of the high pressure turbocharger.

9. The method of claim 8 further comprising:

cooling the low pressure charge air from the low pressure turbocharger compressor outlet prior to the high pressure turbocharger compressor inlet.

10. The method of claim 8 further comprising:

filtering particulate matter from the exhaust gases prior to introduction to the high pressure turbocharger compressor inlet.

11. The method of claim 8 further comprising:

cooling the exhaust gases prior to introduction to the high pressure turbocharger compressor inlet.

12. The method of claim 8 further comprising:

filtering particulate matter from the exhaust gases prior to introduction to the high pressure turbocharger compressor inlet; and after filtering, cooling the exhaust gases prior to introduction to the high pressure turbocharger compressor inlet.

13. The method of claim 8 further comprising:

cooling the low pressure charge air from the low pressure turbocharger compressor outlet prior to the high pressure turbocharger compressor inlet;

filtering particulate matter from the exhaust gases prior to introduction to the high pressure turbocharger compressor inlet; and after filtering, cooling the exhaust gases prior to introduction to the high pressure turbocharger compressor inlet, wherein the exhaust gases are introduced to cooled low pressure charge air.

14. The method of claim 8 wherein the compression ratio of the low pressure turbocharger is greater than 1.5 times the compression ratio of the high pressure turbocharger.

* * * * *